(12) United States Patent
Wen (10) Patent No.: US 8,903,890 B2
(45) Date of Patent: Dec. 2, 2014

(54) SYSTEM, APPARATUS AND METHOD FOR REALIZING WEB SERVICE

(75) Inventor: Changcheng Wen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 935 days.

(21) Appl. No.: 12/534,417

(22) Filed: Aug. 3, 2009

(65) Prior Publication Data

US 2009/0292767 A1 Nov. 26, 2009

Related U.S. Application Data

(63) Continuation of application No. PCT/CN2008/070434, filed on Mar. 6, 2008.

(30) Foreign Application Priority Data

Mar. 12, 2007 (CN) .......................... 2007 1 0086804

(51) Int. Cl.
*G06F 15/16* (2006.01)
*G06Q 30/02* (2012.01)
*H04L 29/08* (2006.01)

(52) U.S. Cl.
CPC ................ *G06Q 30/02* (2013.01); *H04L 67/02* (2013.01)
USPC ............ 709/203; 709/202; 709/217; 709/219

(58) Field of Classification Search
CPC ... H04L 67/16; H04L 41/50; H04L 29/08261; H04L 51/046; H04L 69/329; H04L 67/02
USPC .................. 709/203, 202, 217, 219
See application file for complete search history.

(56) References Cited

U.S. PATENT DOCUMENTS

| | | | |
|---|---|---|---|
| 2002/0078203 A1* | 6/2002 | Greschler et al. ............. | 709/225 |
| 2003/0237052 A1* | 12/2003 | Danielsson et al. ........... | 715/513 |
| 2004/0225656 A1* | 11/2004 | Sarkar ............................... | 707/9 |
| 2004/0225657 A1* | 11/2004 | Sarkar ............................... | 707/9 |

(Continued)

FOREIGN PATENT DOCUMENTS

| | | |
|---|---|---|
| EP | 1376411 A2 | 1/2004 |
| WO | WO0163409 A1 | 8/2001 |

OTHER PUBLICATIONS

International Search Report from P.R. China in International Application No. PCT/CN2008/070434 mailed Jun. 12, 2008.

(Continued)

*Primary Examiner* — Rupal Dharia
*Assistant Examiner* — Mohammed Ahmed
(74) *Attorney, Agent, or Firm* — Conley Rose, P.C.; Grant Rodolph; Nicholas K. Beaulieu (57) ABSTRACT

A system and method for realizing WEB service is provided. The system includes a WEB service signaling server is configured to receive a WEB service choice information sent by a logon WEB service client, obtain a WEB service signaling and a signaling performing logic of a WEB service selected by the WEB service choice information, communicate with the WEB service client and perform the WEB service signaling according to the signaling performing logic, and control a WEB service engine. The WEB service engine is configured to receive a control of the WEB service signaling server, and exchange a WEB service content of the selected WEB service with the WEB service client.

10 Claims, 6 Drawing Sheets

(56) References Cited

U.S. PATENT DOCUMENTS

| | | | |
|---|---|---|---|
| 2004/0260820 A1* | 12/2004 | Bearman | 709/229 |
| 2005/0198200 A1* | 9/2005 | Subramanian et al. | 709/218 |
| 2005/0198365 A1* | 9/2005 | Wei | 709/237 |
| 2005/0257138 A1* | 11/2005 | Chory et al. | 715/513 |
| 2005/0278417 A1* | 12/2005 | Fremantle et al. | 709/203 |
| 2006/0095576 A1* | 5/2006 | Perry et al. | 709/227 |
| 2009/0172086 A1* | 7/2009 | Arthursson et al. | 709/203 |

OTHER PUBLICATIONS

Extended European Search Report dated (mailed) Jan. 15, 2010, issued in related Application No. 0871570.0-1525/2104311, filed Mar. 6, 2008, Huawei Technologies Co., Ltd.

European Patent Office Communication pursuant to Article 94(3) EPC, European search opinion for Application No. 08715170.0-1525, mailed Jun. 7, 2010, Huawei Technologies C., Ltd.

European Patent Office Communication pursuant to Rule 115(1) EPC, Summons to Attend Oral Proceedings for Application No. 08715170.0-1525, nailed Oct. 29, 2010, Huawei Technologies Co. Ltd.

European Patent Office Communication—Invitation pursuant to Article 94(3) and Rule 71(1) EPC, to remedy deficiencies related to Application No. 08715170.0-1525, mailed May 26, 2011, Huawei Technologies Co., Ltd. (3 pgs.).

First Chinese Office Action (translation) of Chinese Application No. 200710086804, mailed on Aug. 15, 2011 (4 pgs).

\* cited by examiner

FIG. 1

(PRIOR ART)

| Current information | Purchase startup | Purchase confirmation | Delivery choice | Purchase complete |
|---|---|---|---|---|
| Customer: XXX<br>Service: purchase/XXX<br>Time span: XXX~XXX<br>State: performance success<br>One grade process: four | Time span: XXX~XXX<br>Content stream: XXX/XXX<br>Result: success | Time span: XXX~XXX<br>Content stream: XXX/XXX<br>Result: purchase | Time span: XXX~XXX<br>Content stream: XXX/XXX<br>Result: no delivery | Time span: XXX~XXX<br>Content stream: XXX/XXX<br>Result: success |

SYSTEM, APPARATUS AND METHOD FOR REALIZING WEB SERVICE

CROSS-REFERENCE TO RELATED APPLICATIONS

The application is a continuation of International Application No. PCT/CN2008/070434, filed Mar. 6, 2008, which claims the benefit of priority to Chinese Patent Application No. 200710086804.8, filed on Mar. 12, 2007, and entitled "SYSTEM, APPARATUS AND METHOD FOR REALIZING WEB SERVICE". The contents of these applications are hereby incorporated by reference in their entirety.

TECHNICAL FIELD

The present disclosure relates to network technologies, and in particular to a system for realizing a WEB service, a signaling server for a WEB service, and a method for realizing WEB service.

BACKGROUND

A WEB service is a main service in the Internet. A user visits the content of the WEB service pointed by a Uniform Resource Locator (URL) and saved in a server according to a Hyper Text Transport Protocol (HTTP) client. The content of WEB service is written by adopting a Hypertext Markup Language (HTML) and an eXtensible Markup Language (XML). The HTML focuses on the form of a user interface of the WEB service, but the XML is used to structure and express the content of the WEB service. Control ability provided by the WEB service is built in the content WEB service. The user inputs a control message according to an indication of the content of the WEB service to change an operation of the WEB service, when the user visits the content of the WEB service.

Figure 1:
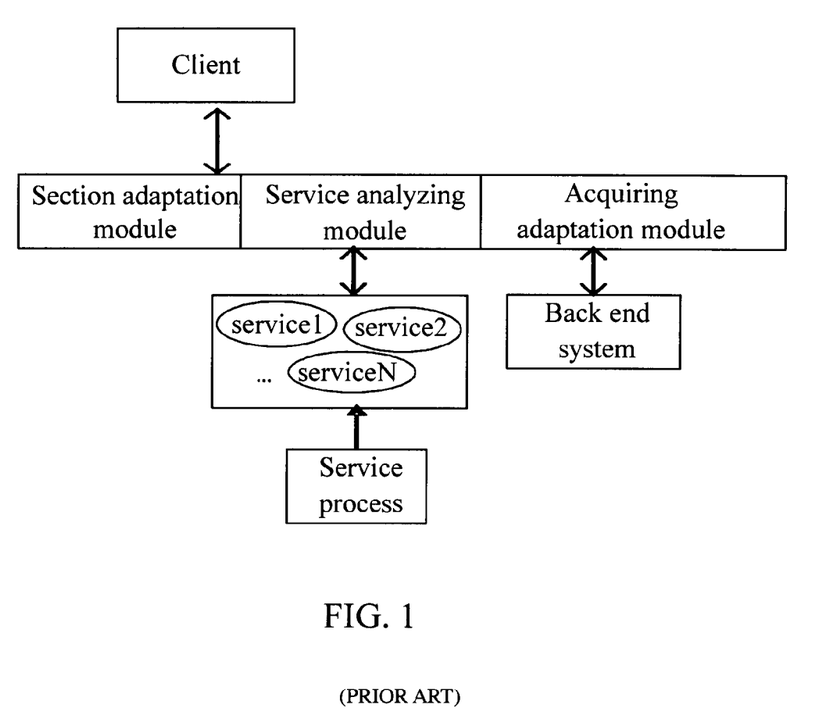
FIG. 1 illustrates a structure diagram of a solution realization of WEB service in the prior art.

FIG. 1 illustrates a conventional solution for realizing the WEB service, and the operation process of the WEB service is as follows:

(1) Communication between a client and a section adaptation module is established for initiating an operation of the WEB service.

(2) A service analyzing module analyzes the WEB service to a service combination including n sub-services according to the requirement of service process.

(3) Content of the n sub-services is obtained via querying a back end system according to an acquiring adaptation module.

(4) The service analyzing module operates the obtained n sub-services according to a service combination requirement of the service process, and sends a result to the client.

However, a conventional solution for realizing the WEB service may suffer from some of the following defects:

(1) Issues on whether the service is available, the performing process of service, the operation control of service, and used network resource are notified gradually from the content of WEB service after the WEB service is initiated.

(2) An operation control of WEB service has no determined realization mode, which is adverse to popularity of the WEB service.

(3) Authentication, authorization control and charging of WEB service operation are difficult to be implemented. It is difficult to guarantee Quality of Service (QoS) and security of the transfer channel in advance when the WEB service is transferred from the server to the client.

BRIEF SUMMARY

A system for realizing WEB service is provided. According to some embodiments, the system includes a WEB service signaling server configured to receive a WEB service choice information sent by a logon WEB service client, obtain a WEB service signaling and a signaling performing logic of a WEB service selected by the WEB service choice information, communicate with the WEB service client and perform the WEB service signaling according to the signaling performing logic, and control a WEB service engine. The WEB service engine is configured to receive a control of the WEB service signaling server, and exchange a WEB service content of the selected WEB service with the WEB service client.

A WEB service signaling server is also provided. According to some embodiments, the WEB service signaling server includes a user signaling interface module configured to exchange a WEB service signaling with a WEB service client, a user logon and authentication module configured to receive a logon request sent by the WEB service client, and authenticate a user identity and an authority use WEB service type, a signaling information obtaining module configured to obtain a WEB service signaling and a signaling performing logic of a WEB service chose by the WEB service client, a signaling interaction control performing module configured to receive a signaling sent by the user signaling interface module, send another signaling to the user signaling interface module, and control a content exchange control module according to the WEB service signaling and signaling performing logic obtained by the signaling information obtaining module, and the content exchange control module configured to control a WEB engine for exchanging a service content with the WEB service client, and control the WEB engine for exchanging another service content with a WEB service content providing unit.

A WEB service engine is also provided. According to some embodiments, the WEB service engine includes a signaling control module configured to exchange a control signaling with a WEB service signaling server, a WEB resource logon module configured to log on to a WEB service content, and communicate with a content transmitting and receiving module, and the content transmitting and receiving module configured to send the WEB service content to a WEB service client, or receive content information sent by the WEB service client.

A method for realizing WEB service is also provided. According to some embodiments, the method includes receiving, by a WEB service signaling server, a logon request sent by a WEB service client, completing the client logon a network, obtaining a corresponding WEB service signaling and a signaling performing logic of a selected WEB service, according to the client's selection of a WEB service, and exchanging the WEB service signaling with the WEB service client, performing the WEB service signaling and controlling a WEB service engine for exchanging a WEB service content with the WEB service client by a transmission network, according to the signaling performing logic.

According to some embodiments of the present invention, in the process of operating the WEB service, the WEB service signaling control and the WEB service content are separated. The signaling control of the WEB service may cooperate with different WEB service content because the signaling control of the WEB service represents a universal WEB service operation control procedure, so that the WEB service operator may pay attention to maintenance and exploitation of the signaling control process of the WEB service. If the operation cooperator is a content provider, the providing of the WEB service content is paid attention to, which is useful to improve efficiency of the WEB service operation and promote popularization of the WEB service.

The accompanying drawings, which are incorporated in and constitute a part of this specification, illustrate some embodiments and together with the description, serve to explain the principles of the embodiments disclosed herein.

DETAILED DESCRIPTION OF THE DISCLOSED EMBODIMENTS

Figure 2:
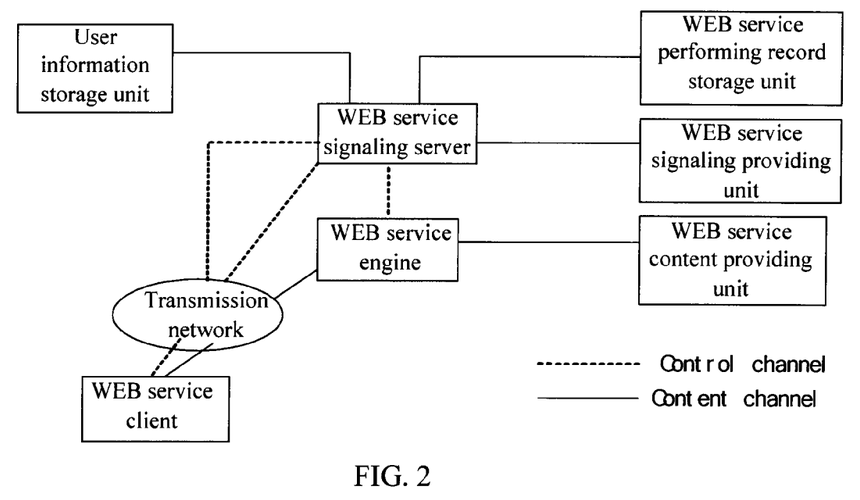
FIG. 2 illustrates a structure diagram of a system for realizing WEB service according to some embodiments.

FIG. 2 illustrates a structure diagram of the system for realizing WEB service according to some embodiments. The system includes: a user information storage unit, a WEB service signaling server, a WEB service performing record storage unit, a WEB service signaling providing unit, a WEB service engine, a WEB service content providing unit, a WEB service client, and a transmission network.

The functions implemented by each unit and information transmitted between the units are as follows:

(1) The user information storage unit is configured to store service register information of the WEB service user, receive a request of the WEB service signaling server, and transmit the service register information of the WEB service user to the WEB service signaling server. The service register information of the WEB service user includes a user number, a user password, a user service grade, a service authority, and so on.

(2) The WEB service signaling sever is configured to:

a) obtain from the user information storage unit the service register information of the WEB service user, and authenticate a user identity and determine the type of a WEB service that the user has an authority to use according to the service register information of the WEB service user;

b) obtain signaling information of the user's authorized WEB service perform a logic according to the signaling, and perform the WEB service signaling selected by the user;

c) exchange the WEB service signaling with the WEB service client, receive a control message sent by the WEB service client, and send performance state information of WEB service to the WEB service client;

d) control the WEB service engine's logon to the WEB service content providing unit, and exchange the WEB service content with the WEB service client;

e) negotiate with a resource management device of the transmission network, request the transmission network to provide a bearer channel, the bearer channel is configured to bear a security of service content transmitted between the WEB service engine and the WEB service client and a guarantee of service quality; and f) record operation information of the WEB service, and send the operation information to the WEB service performing record storage unit in order to implement a charging function according to the operation information of the WEB service.

(3) The WEB service performing record storage unit is configured to store the operation information of the WEB service sent by the WEB service signaling server, the operation information of the WEB service is used for charging.

(4) The WEB service signaling providing unit is configured to store the WEB service signaling and a signaling performing logic, the WEB service signaling and a signaling performing logic are issued by a management operator, receive an obtaining request of the WEB service signaling server, and transmit the WEB service signaling and signaling performing logic corresponding to the current WEB service selected by the user to the WEB service signaling server.

(5) The WEB service engine is configured to:

be controlled by the WEB service signaling server, log on to the WEB service content providing unit, obtain the WEB service content, and send the obtained WEB service content to the WEB service client;

receive service content information input by the user sent by the WEB service client, and send the service content information input by the user to the WEB service content providing unit; and control velocity of flow of the WEB service content, encrypt and decrypt a service traffic.

(6) The WEB service content providing unit is configured to provide and receive the WEB service content. The WEB service content may include a plurality of WEB service function parts existing in network, where one function part implements one special function, cooperate to realize a performing WEB service.

The WEB service content providing unit may be another WEB service engine. Take a business scenario for example: both a user A and a user B use a WEB service, the user B is a service content providing unit of the user A, cooperating to realize the WEB service of the user A.

A group of eXtensible Markup Language (XML) protocols is supported by the WEB service content providing unit as a logon protocol, for example, a Simple Object Access Protocol (SOAP), and thus may be logged on by the WEB service engine.

The WEB service signaling server may provide another protocol interface for realizing a logon to the WEB service resource, such as the hypertext transfer protocol (HTTP).

(7) The WEB service client is configured to exchange the service signaling with the WEB service signaling server, send operation control information of the user to the WEB service signaling server, and receive and display information such as operation state indication sent by the WEB service signaling server.

The WEB service client is further configured to receive the WEB service content sent by the WEB service engine, display the received WEB service content, and send the WEB service content information input by the user to the WEB service engine.

(8) The transmission network is configured to transmit a control of the WEB service signaling server received by a correlated resource management device in transmission network, and provide a bearer channel of security and guarantee of service quality for the WEB service content. The transmission network may be a network device for bearing the WEB service traffic, including a service signaling and service content.

The WEB service signaling server and the WEB service engine may be independent logic entities which may be arranged in a same physical entity, or arranged in different physical entities respectively. The WEB service signaling providing unit and the WEB service content providing unit may be independent logic entities which may be arranged in a same physical entity, or arranged in different physical entities respectively.

FIG. 2 illustrates a structure diagram of a system for WEB service realization provided according to some embodiments. If the user wants to use the WEB service, the user needs to apply to the WEB service operator for the WEB service in advance, the service including phone, business, shopping, information, and entertainment applied by the user. The WEB service operator provides and saves some information for the user. The information is as follows:

1) a user identity, such as telephone number;
2) a user password, which is set for the user;
3) a WEB service providing point, which is the URL of the WEB service signaling server.

The user identity, the user password, the WEB service providing point, and the five WEB services information are saved in the user information storage unit by the WEB service operation.

After the user applies the WEB service, the user starts up the WEB service client, and logs on to the WEB service signaling server; the WEB service signaling server requests the WEB service client to input the user identity and the user password, and matches the input user identity and the user password with a user identity and a user password saved in the user information storage unit in order to authenticate a validity of the user identity, after receiving the user identity and the user password sent by the WEB service client; the WEB service signaling server obtains an executive WEB service category applied by the user from the user information storage unit after achieving authenticating, and sends the executive WEB service category information to the WEB service client; the WEB service client generates a original WEB service signaling structure tree after receiving the executive WEB service category information.

Figure 3:
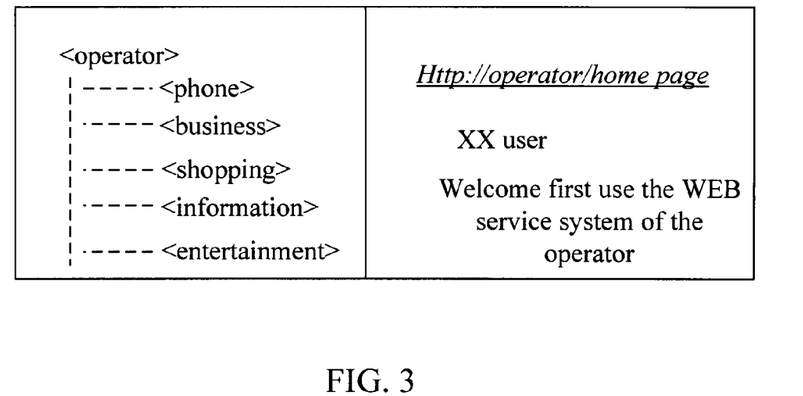
FIG. 3 illustrates a WEB user interface displayed by WEB service signaling server when entering firstly according to some embodiments.

FIG. 3 illustrates a WEB service user interface displayed by WEB service signaling server when entering firstly provided according to some embodiments. When the user starts up the WEB service client and logs on to the WEB service signaling server, a WEB service client interface is displayed. A WEB service signaling structure tree is displayed on the left area interface. A first layer node of the WEB service signaling operation structure tree illustrates the WEB service category that the user has an authority use. The signaling structure illustrates an available state of the WEB service dynamically, for example, the state of the business service is not available, and the state of the phone service, the shopping service, the information service, and the entertainment service is available. The right area interface is an input and display area of the WEB service content.

Figure 4:
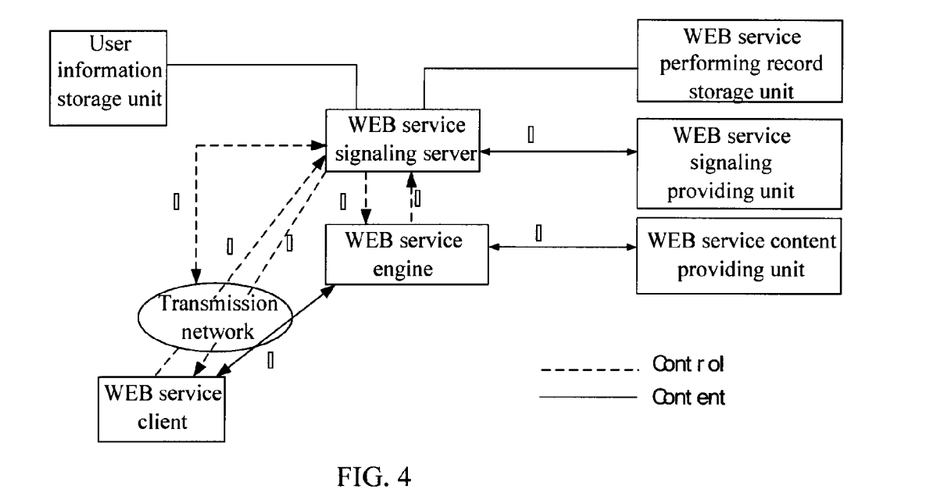
FIG. 4 illustrates a processing process of operating WEB service according to some embodiments.

When the user clicks a shopping signaling node of the WEB service signaling structure tree displayed on the WEB service client, that is, the shopping service is started up. FIG. 4 illustrates a processing process of operating WEB service according to some embodiments, and includes the following steps:

①: The WEB service client sends a WEB service signaling adopted to start up a special WEB service to the WEB service signaling server. In this procedure, it is supposed the shopping WEB service is started up.

②: The WEB service signaling server determines whether the WEB service selected by the user is available, requests the WEB service signaling and signaling performing logic corresponding to the WEB service selected by the user from the WEB service signaling providing unit if the WEB service is available, and loads the WEB service signaling and signaling performing logic corresponding to the WEB service selected by the user.

Figure 5:
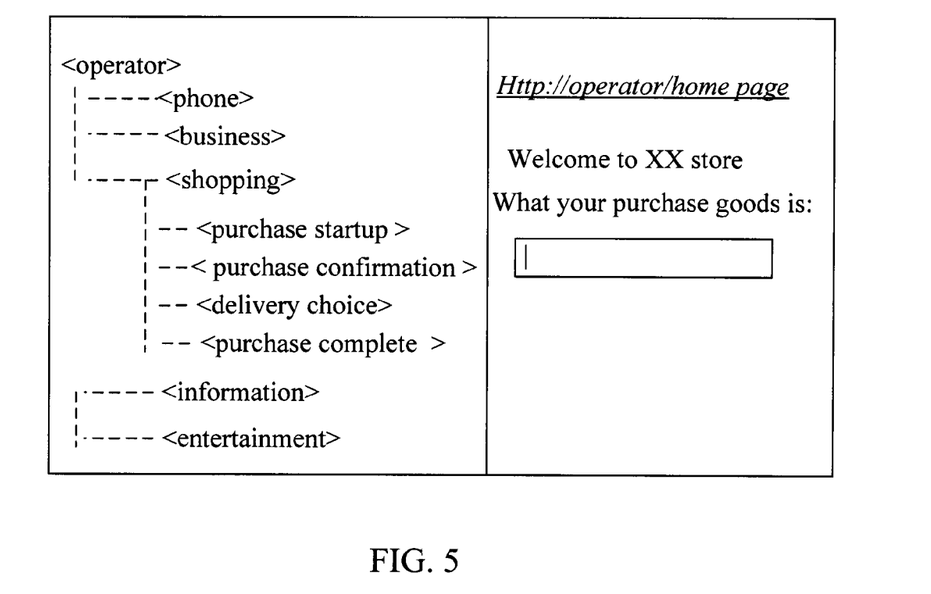
FIG. 5 illustrates a WEB user interface when initiating specific WEB service.

③: The WEB service signaling server sends a WEB service signaling of refreshing operation state. The WEB service signaling structure tree is extended at the WEB service client. FIG. 5 illustrates a WEB user interface when initiating specific WEB service. A next layer signaling node is extended under the shopping signaling node, including a purchase startup signaling node, a purchase confirmation signaling node, a delivery choice signaling node, and a purchase complete signaling node, where the purchase startup signaling node is performed firstly.

④: The WEB service signaling server control the bearing channel exchanged by the transmission network, which satisfies security and service quality request. The control of the WEB service signaling server includes a bandwidth, a delay, a jitter, a loss ratio, a channel encryption key, a service traffic prohibited from copying, and so on.

⑤: The WEB service signaling server controls the service content exchanged between the WEB service engine and the WEB service client.

⑥: The WEB service engine logs on to the WEB service content providing unit and obtains the WEB service content.

⑦: The WEB service engine exchanges the WEB service content with the WEB service client.

⑧: The WEB service engine confirms a control command exchanged with the WEB service content to the WEB service signaling server, wherein the control command has been performed completely.

As shown in FIG. 4, the WEB service signaling server obtains the WEB service signaling and signaling performing logic, and controls the WEB service operation. The WEB service operation is under the control of the WEB service signaling from some aspects, which is as follows:

displaying the WEB service which may operate
starting the WEB service operation;
ending the WEB service operation;
canceling the WEB service operation;
revising the content of the WEB service operation;
displaying the current state of the WEB service operation, the indication of the WEB service operation, and other information of the WEB service operation which may be used;
selecting a service rule of the WEB service operation, including the service signaling corresponding to the WEB service, the WEB service type, and the signaling performing logic, wherein the signaling performing logic includes a layer grade relation among the signaling, and an early or late performing order of the signaling; the service rule may be as an information frame of particular record of the WEB service operation;

negotiating with the transmission network of the WEB service operation to ensure the service quality of the WEB service operation; and negotiating with the transmission network of the WEB service operation to establish the security channel of the WEB service operation.

Figure 6:
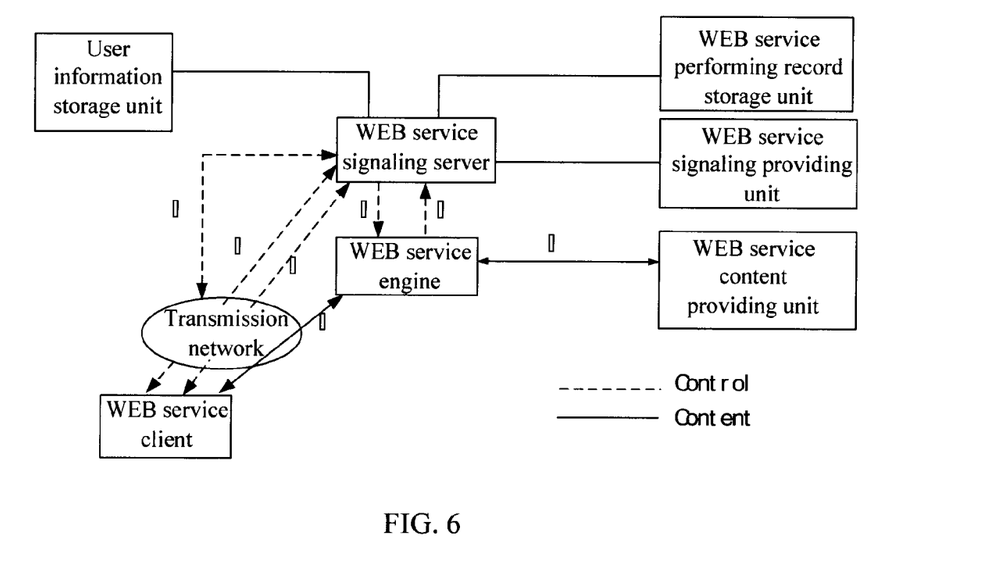
FIG. 6 illustrates a processing process of performing interaction control according to WEB service signaling type according to some embodiments.

The user starts up the WEB service, the WEB service signaling server obtains the WEB service signaling from the WEB service signaling providing unit, and the process of performing the interaction control for the current signaling node to be performed and the WEB service client is displayed by FIG. 6, including:

①: The WEB service signaling server parses the signaling node type of the WEB service signaling, and performing interaction control according to the signaling node type, the signaling node type includes a reply type, a receive type, a bidirectional interaction type, and a structure type. The reply type may be information input from the WEB service client to a network, including a control command which is sent to the WEB service signaling server and the content information which is sent to the WEB service engine, the control command includes startup, cancel, select a performing embranchment, and so on. The receive type may be information received from the network and displayed by the WEB service client, including the performance state information sent by the WEB service signaling server and the content information sent by the WEB service engine. The bidirectional interaction type may include the replay type and an interaction control of the receive type. The structure type may be a service signaling of a next layer grade of the current WEB service signaling sent from the WEB service signaling server to the WEB service client, and may be a next grade signaling node of the current signaling node of the WEB service signaling structure tree extended on the WEB service client interface.

②: The WEB service signaling server controls the transmission network for satisfying a requirement for security and service quality.

③: The WEB service signaling server controls the WEB service content exchanged between the WEB service engine and the WEB service client.

④: The WEB service engine exchanges the WEB service content with the WEB service content providing unit.

⑤: The WEB service engine exchanges the WEB service content with the WEB service client.

⑥: The WEB service engine confirms to the WEB service signaling server that the WEB service content is performed completely.

⑦: The WEB service signaling server sends a refreshed signaling node state to the WEB service client.

FIG. 6 illustrates the performing of a single WEB service signaling node. A complete procedure for the WEB service signaling server to perform entire service signaling of a WEB service is as follows:

It is supposed that the WEB service signaling server obtains the WEB service signaling and the signaling performing logic from the WEB service signaling providing unit, the WEB service signaling and the signaling performing logic are as follows:

```
//----------------------------------------------------
<process ...>
    ...
```

```
    <sequence name=shopping>
        <reply partner=p2,...name= "purchase startup"> ...
        </reply>
        <pick parter=p2,...opname= "purchase confirmation">
            <reply opname= "purchase"> ... </reply>
            <reply opname= "no purchase"> ... </reply>
        </pick>
        <pick parter=p2,...opname= "delivery choice">
            <reply opname= "delivery"> ... </reply>
            <reply opname= "no delivery"> ... </reply>
        </pick>
        <receive   partner=p2,...   opname=purchase
        end> ...</receive>
    </sequence>
</process>
//----------------------------------------------------.
```

The WEB service signaling server performs the logic according to the signaling, the step of performing entire WEB service signaling logic is as follows:

1: The WEB service signaling server obtains a first layer service signaling node of a chose WEB service, identifies the state of the first layer service signaling node as no performing, and sends the first layer service signaling node to the WEB service client, that is, obtain the first service signaling node of the shopping WEB service, including the purchase startup, the purchase confirmation, the delivery choice, and the purchase end, and then send to the WEB service client.

2: The WEB service client receives the first layer service signaling node, and extends a signaling operation structure of the operated service such as the shopping WEB service. For example, the shopping Web service is extended to a next layer signaling node which includes four signaling nodes such as the purchase startup, the purchase confirmation, the delivery choice, and the purchase end, identifies the state of the next layer node for not performing, and performs the first signaling node such as the purchase startup.

3: If the current performed service signaling node is not a structural type, the WEB service signaling server controls the transmission network to establish a channel for ensuring security and service quality.

a) If the service signaling node is the reply type, the WEB service client sends the signaling information to the WEB service signaling server, and sends the content information input by user to the WEB service engine.

b) If the service signaling node is the receive type, the WEB service signaling server sends the current operation state information of the WEB service to the WEB service client; the WEB service client receives and displays the current state information of the WEB service sent by the WEB service signaling server, and receives the WEB service content sent by the WEB service engine.

c) If the service signaling node is the bidirectional interaction type, the WEB service client sends the signaling information to the WEB service signaling server, and sends the content information input by user to the WEB service engine; and the WEB service signaling server sends the current operation state information of the WEB service to the WEB service client; the WEB service client receives and displays the current state information of the WEB service sent by the WEB service signaling server, and receives the WEB service content sent by the WEB service engine.

Figure 7:
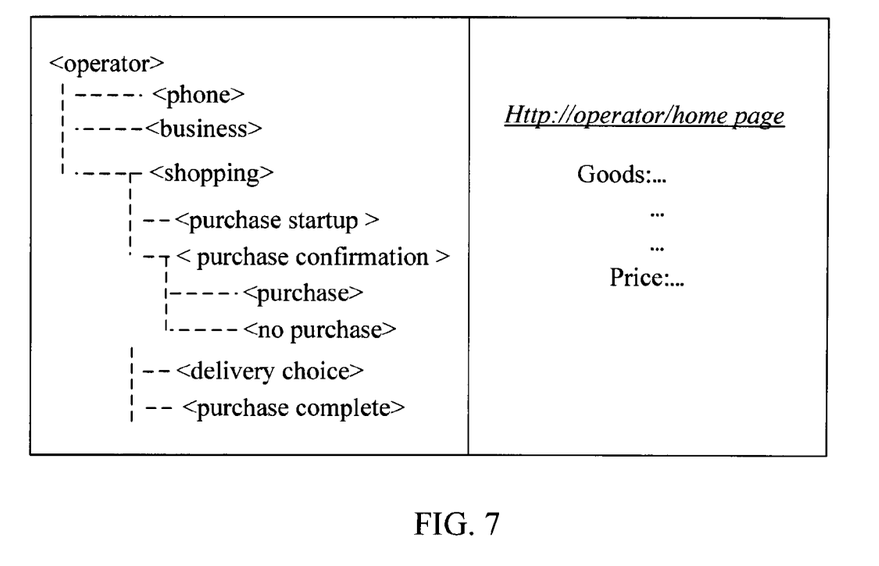
FIG. 7 illustrates a WEB user interface of next level signaling node of signal configuration tree expanded by WEB service client according to received signaling according to some embodiments.

If the service signaling node is the structure type, it means that a next layer service signaling interaction exists. The WEB service signaling server continues to obtain the next layer service signaling, identifies the state of the next layer signaling for not performing, and sends the signaling to the WEB service client. For example, in the above process of the shopping service, when the WEB service signaling server performs the purchase confirmation, sends a next layer sub-signaling to the WEB service client. After the WEB service client receives the next layer sub-signaling, extends a next layer signaling node of the signaling structure. FIG. 7 illustrates the next layer signaling node of the purchase confirmation signaling node extended by the WEB service client, and the next layer signaling node includes a purchase sub-signaling node and a no purchase sub-signaling node.

For each grade sub-signaling node of the structural signaling node, the step performed according to the specific type of the structural signaling node is as follows:

a) If the type of structural signaling node is an order type, each sub-signaling node is performed in order until the last sub-signaling node is performed completely.

b) If the type of structural signaling node is a parallel type, performing any sub-singling node in no order until all the sub-signaling nodes are performed completely.

c) If the type of structural signaling node is a choice type, one or part of sub-signaling node is selected to perform until the WEB service signaling server notifies that the step is performed completely.

The entire WEB service is a structural signaling node, for example, the shopping WEB service is a structural signaling node of order type.

When the WEB service is performing the structural signaling node, the WEB service signaling server refreshes and displays the sub-signaling node has been performed, the sub-signaling node be performing, and the sub-signaling node not performed in real time; extends and the sub-signaling node of an operating structural service node, and folding the sub-signaling node of an structural service node with its operation ended; displaying the availability of a WEB service dynamically. An available state of the WEB service and a service performance state displayed dynamically by the signaling structure tree are illustrated in FIG. 7, the purchase startup in italics means that the service signaling has been performed, and the purchase confirmation in bold means that a current phase is a purchase confirmation phase.

The steps 3 and 4 are repeated until the all signaling nodes of the entire WEB service are performed completely, or a user may suspend the current service during the operating process.

Figure 8:
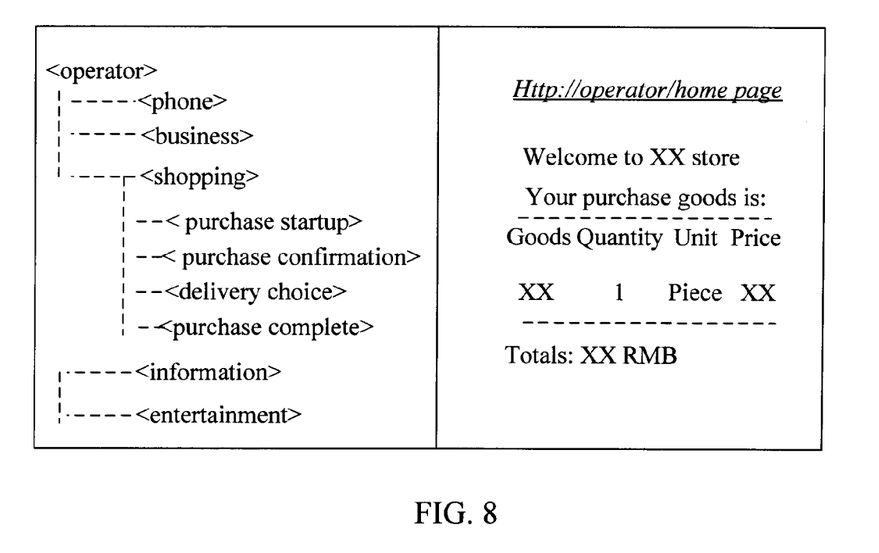
FIG. 8 illustrates a WEB user interface of accomplished and confirmed WEB service of a WEB service client sent by a WEB service signaling server according to some embodiments.

After one WEB service is started up, it needs to end, and the completion confirmation sent from the WEB service signaling server to the WEB service client is a mark of the end. The WEB service client interface of completion confirmation shopping sent from the WEB service signaling server to the WEB service client is illustrated in FIG. 8.

Figure 9:
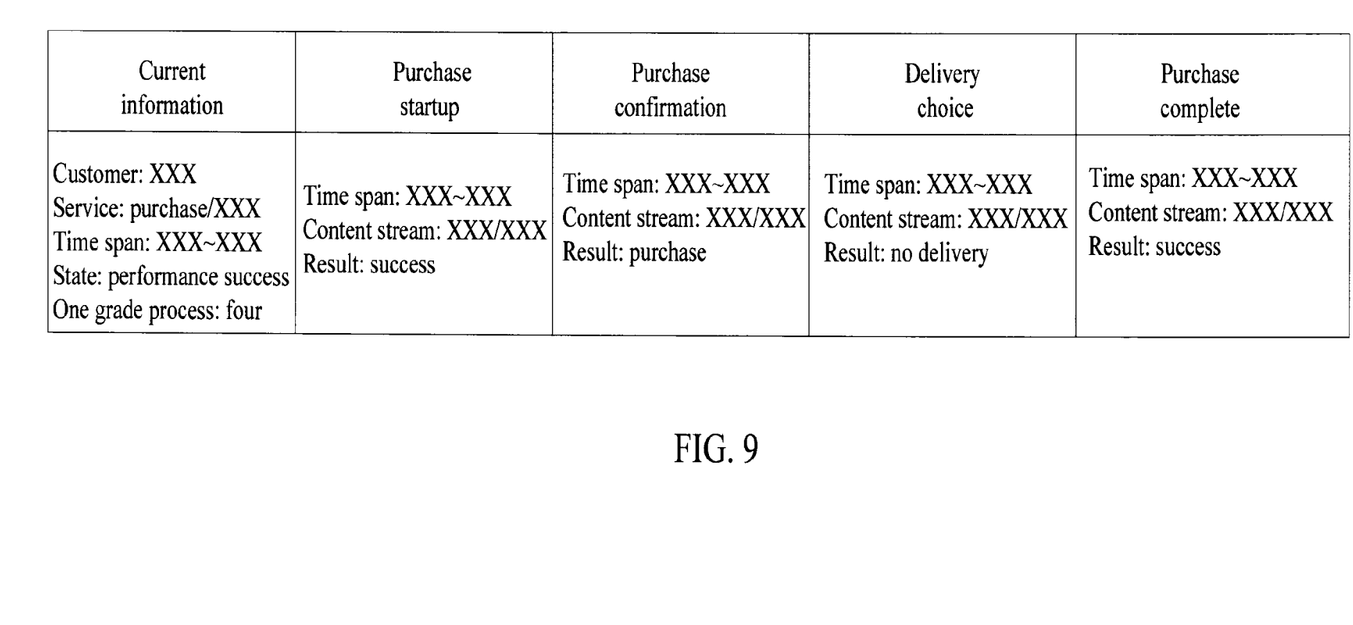
FIG. 9 illustrates a schematic view of a WEB service performing recording message according to some embodiments.

After performing the shopping WEB service, the WEB service signaling server sends a WEB service performing record information to the WEB service performing record storage unit. The WEB service performing record information includes the performing process of each signaling node constituting the WEB service. Referring to FIG. 9, the performing record information of shopping WEB service includes performing record information of four signaling nodes such as purchase startup, purchase confirmation, delivery choice, and purchase complete. After the WEB service is performed, the special record of the current service may be inquired by user.

Figure 10:
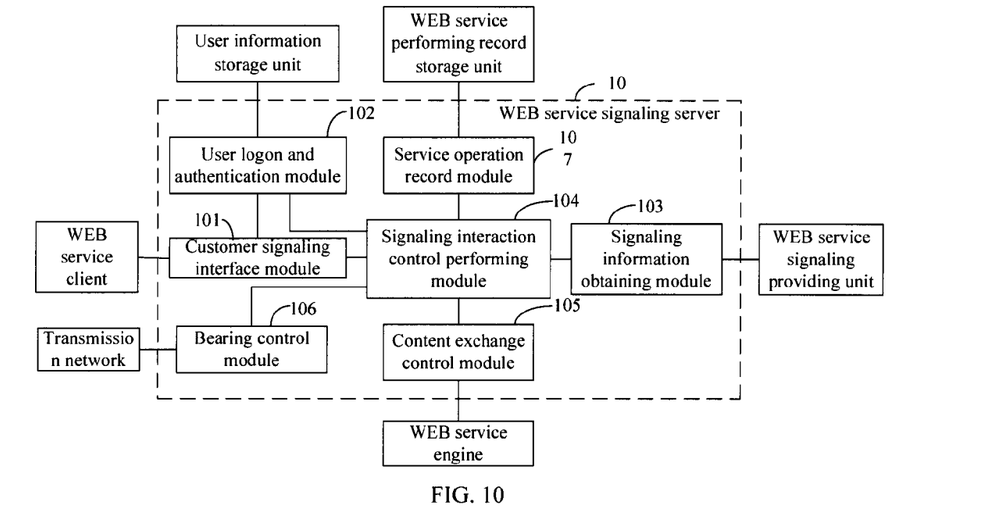
FIG. 10 illustrates a structure diagram of WEB service signaling server.

FIG. 10 illustrates a structure diagram of WEB service signaling server 10. The WEB service signaling server includes a user signaling interface module 101, a user logon and authentication module 102, a signaling information obtaining module 103, a signaling interaction control performing module 104, a content exchange control module 105, a bearing control module 106, and a service operation record module 107.

The user signaling interface module 101 is configured to establish a connection with the WEB service client, and bear a service signaling.

The user logon and authentication module 102 is configured to receive a logon request sent by the WEB service client, obtain user correlated information from the user information storage unit, and authenticate user identity and an authority use WEB service type.

The signaling information obtaining module 103 is configured to obtain a WEB service signaling and a signaling performing logic of the selected WEB service from the WEB service signaling providing unit, and send to the signaling interaction control performing module 104.

The signaling interaction control performing module 104 is configured to receive the signaling from the user signaling interface module 101, and send another signaling to the user signaling interface module 101, control the content exchange control module 105 and bearing control module 106 according to the WEB service signaling and signaling performing logic.

The content exchange control module 105 is configured to control the WEB service engine, including controlling the service content exchanged between the WEB service engine and the WEB service client, and controlling another service content exchanged between the WEB service engine and the WEB service content providing unit.

The bearing control module 106 is configured to control the transmission network for providing a bearing channel of guaranteeing security and service quality.

The service operation record module 107 is configured to record the current operation information of the selected WEB service, and send to the WEB service performing record storage unit.

Figure 11:
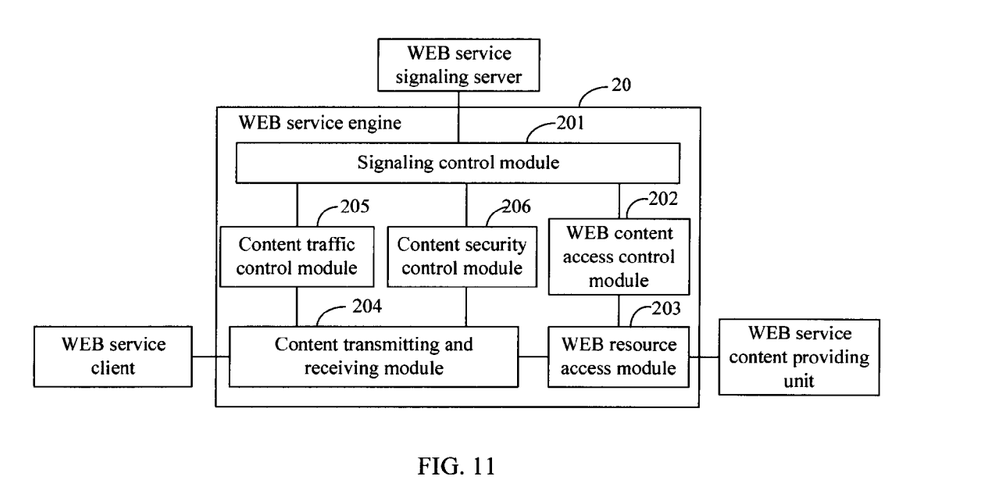
FIG. 11 illustrates a structure diagram of WEB service engine.

FIG. 11 illustrates a structure diagram of WEB service engine, including a signaling control module 201, a WEB content logon control module 202, a WEB resource logon module 203, a content transmitting and receiving module 204, a content traffic control module 205, and a content security control module 206.

The signaling control module 201 is configured to exchange a control signaling with the WEB service signaling server. The signaling control module 201 is further configured to send a service traffic control signaling to the content traffic control module 205, send a service security control signaling to the content security control module 206, and send a content logon control signaling to the WEB content control module 202.

The WEB content logon control module 202 is configured to control and coordinate the WEB resource logon module 203 to obtain the WEB service content.

The WEB resource logon module 203 is configured to log on to the WEB service content, and exchange with the content transmitting and receiving module 204.

The content transmitting and receiving module 204 is configured to send the WEB service content to the WEB service client, or receive the content information sent by the WEB service client. The content transmitting and receiving module 204 is further configured to receive a scream control command sent by the content traffic control module 205, and receive a decryption or encryption processing command sent by the content security control module 206. The scream control command is configured to perform traffic controlling for the WEB service content. The decryption or encryption processing command is configured to perform decryption or encrypt process for the WEB service content.

The content traffic control module 205 is configured to receive and parse the screaming service control signaling sent by the signaling control module 201, and send the specific traffic control command to the content transmitting and receiving module 204.

The content security control module 206 is configured to receive and parse the service security control command sent by the signaling control module 201, and send the specific decryption processing command to the content transmitting and receiving module 204.

According to the embodiments of the present invention, in the WEB service operation, the WEB service signaling control and the WEB service content are separated. The signaling control of the WEB service may be adaptive to different WEB service contents because the signaling control of the WEB service represents a universal WEB service operation control rule, thereby making the WEB service operator pay attention to maintenance and development of the signaling control process of the WEB service. If the operation cooperator is a content provider, attention needs to be paid to the providing of the WEB service content, which is useful for providing the WEB service operation efficiency, and promoting the popularization of the WEB service.

According to some embodiments, the WEB service signaling structure tree displayed in the WEB service client interface represents an available WEB service, a signaling performed, a signaling to be performed, and brings a convenience for the user. Because of the existence of the WEB service signaling, the WEB service operation may be supported conveniently, for example, the authentication, the authorization control, charging, service quality, security control, and so on.

It is understandable to those skilled in the art that the disclosed embodiments may be implemented through software in addition to a universal hardware platform or through hardware only. In most cases, however, software in addition to a universal hardware platform is preferred. Therefore, the disclosed embodiments be embodied by a software product. The software product is stored in a tangible, computer-readable storage medium and incorporates several instructions which instruct a computer device having a processor, for example, PC, server, or network device, to execute the method provided in each embodiment of the present invention. Although the invention is described through some exemplary embodiments, the disclosure is not limited to such embodiments. It is apparent that those skilled in the art can make various modifications and variations to the disclosed embodiments without departing from the spirit and scope of the invention.

What is claimed is:

1. A hardware system for realizing a WEB service, comprising:
  a WEB service signaling server communicating with a WEB service client through a transmission network; and
  a WEB service engine configured to be controlled by the WEB service signaling server and to exchange a WEB service content of a selected WEB service with the WEB service client,
  wherein the WEB service signaling server comprises a processor, and
  wherein the processor comprises:
    a signaling information obtaining module configured to obtain a WEB service signaling and a signaling performing logic of a WEB service chosen by the WEB service client from a WEB service signaling providing unit, wherein the WEB signaling providing unit stores the WEB service signaling and the signaling performing logic that are issued by a management operator such that the WEB service signaling server exchanges a WEB service signaling with the WEB service client and sends performance state information of the WEB service to the WEB service client, wherein the signaling performing logic comprises a layer grade relation and a performing order of the WEB service signaling, wherein a service signaling node is a structure type, wherein a next layer service signaling interaction exists, and wherein the WEB service signaling server continues to obtain a next layer service signaling, identifies a state of a next layer signaling for not performing, and sends signaling to the WEB service client;
    a signaling interaction control performing module configured to receive a signaling sent by a user signaling interface module, send another signaling to the user signaling interface module, and control a content exchange control module according to the WEB service signaling and the signaling performing logic obtained by the signaling information obtaining module, wherein the content exchange control module is configured to control a WEB engine for exchanging a service content with the WEB service client and control a WEB engine for exchanging another service content with a WEB service content providing unit; and
    a service operation record module configured to record operation information of the selected WEB service and send the operation information to a WEB service performing record storage unit.

2. The system of claim 1, further comprising a storage, wherein the storage comprises a user information storage unit, and wherein the user information storage unit is configured to:
  store service register information of a WEB service user;
  receive a request for obtaining the service register information of the WEB service user sent by the WEB service signaling server; and
  feed the service register information of a current logon user back to the WEB service signaling server.

3. The system of claim 2, wherein the WEB service signaling providing unit is configured to:
  store corresponding WEB service signalings and signaling performing logics of different WEB services;
  receive a request for obtaining signaling information sent by the WEB service signaling server; and
  feed the WEB service signaling and signaling performing logic corresponding to the selected WEB service back to the WEB service signaling server.

4. The system of claim 3, wherein the WEB service content providing unit is configured to:
  provide a corresponding WEB service content of the WEB service;
  receive a logon of the WEB service engine; and
  exchange a corresponding WEB service content of the selected WEB service with the WEB service engine.

5. The system of claim 4, wherein the WEB service performing record storage unit is configured to store operation information of WEB service recorded and sent by the WEB service signaling server.

6. A method for realizing WEB service, comprising:
  receiving a logon request sent by a WEB service client;
  implementing a process of the WEB service client logging on to a network;

obtaining, by a WEB service signaling server, a WEB service signaling and a signaling performing logic corresponding to a selected WEB service according to the WEB service client's selection of the WEB service, wherein the WEB service signaling and the signaling performing logic are stored in a WEB service signaling providing unit and are issued by a management operator, wherein the WEB service signaling server exchanges a WEB service signaling with the WEB service client and sends performance state information of the WEB service to the WEB service client, wherein the signaling performing logic comprises a layer grade relation and a performing order of the WEB service signaling, wherein a service signaling node is a structure type, wherein a next layer service signaling interaction exists, and wherein the WEB service signaling server continues to obtain a next layer service signaling, identifies a state of a next layer signaling for not performing, and sends signaling to the WEB service client;

exchanging, by the WEB service signaling server, the WEB service signaling with the WEB service client, performing the WEB service signaling, and controlling a WEB service engine for exchanging a WEB service content with the WEB service client by a transmission network, according to the signaling performing logic;

recording, by the WEB service signaling server, operation information of the selected WEB service, and sending the operation information to a WEB service performing record storage unit for storing;

negotiating, by the WEB service signaling server, a bearing channel of the WEB service content with a resource management device of the transmission network; and exchanging, by the WEB service engine, the WEB service content with the WEB service client according to the negotiated bearing channel.

7. The method of claim 6, further comprising:

pre-storing service register information of a WEB service user; and upon receiving the logon request of the WEB service client, obtaining, by the WEB service signaling server, the stored service register information of a currently logged-on user to authenticate a user identity and controlling a type of the WEB service that a user is entitled to use.

8. The method of claim 6, further comprising pre-storing the WEB service signaling and signaling performing logic corresponding to different WEB services, and obtaining, by the WEB service signaling server, the corresponding WEB service signaling and signaling performing logic according the selected WEB service.

9. The method of claim 7, wherein exchanging with the WEB service client and performing the WEB service signaling according to the signaling performing logic comprises:

obtaining, by the WEB service signaling server, a first layer service signaling of the selected WEB service, and parsing the type of the WEB service signaling;

sending the service signaling to the WEB service client, denoting that the corresponding signaling information is sent to the WEB service signaling server by the WEB service client, and sending content information input by user to the WEB service engine when the service signaling is a reply type;

sending current operation state information to the WEB service client, wherein the current operation state information is received and displayed by the WEB service client, and sending the WEB service content to the WEB service client by the WEB service engine when the service signaling is a receive type;

performing a process of the received type and the reply type when the service signaling is a bidirectional interaction type; and presenting that a next layer service signaling is existed, obtaining the next layer service signaling continually by the WEB service signaling server, parsing a corresponding type of the next layer service signaling, repeating the process of parsing the service signaling type, until all service signaling of the selected WEB service are parsed completely, or receiving a user suspend command when the service signaling is a structure type.

10. The method of claim 6, wherein controlling of the WEB service engine for exchanging the WEB service content with the WEB service client comprises:

obtaining, by the WEB service engine, a content exchange control command from the WEB service signaling server;

obtaining, by the WEB service engine, a corresponding WEB service content of the selected WEB service, and sending to the WEB service client according to the transmission network; and receiving, by the WEB service engine, content information of user input sent by the WEB service client, and sending the content information of user input to a WEB service content providing unit.

* * * * *